(12) United States Patent
Du et al.

(10) Patent No.: US 12,349,612 B2
(45) Date of Patent: Jul. 8, 2025

(54) WEEDING MACHINE AND WEEDING METHOD FOR SEEDLINGS IN PADDY FIELD

(71) Applicant: ZHEJIANG UNIVERSITY, Hangzhou (CN)

(72) Inventors: Dongdong Du, Hangzhou (CN); Jun Wang, Hangzhou (CN); Zhenbo Wei, Hangzhou (CN); Dongfang Li, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 546 days.

(21) Appl. No.: 17/956,856

(22) Filed: Sep. 30, 2022

(65) Prior Publication Data

US 2023/0021925 A1    Jan. 26, 2023

Related U.S. Application Data

(63) Continuation of application No. PCT/CN2020/117562, filed on Sep. 25, 2020.

(30) Foreign Application Priority Data

Jul. 30, 2020    (CN) .......................... 202010753597.2

(51) Int. Cl.
*A01B 39/18*    (2006.01)
*A01D 34/53*    (2006.01)
(Continued)

(52) U.S. Cl.
CPC .............. *A01B 39/18* (2013.01); *A01D 34/53* (2013.01); *A01D 45/04* (2013.01); *A01M 21/02* (2013.01)

(58) Field of Classification Search
CPC ...... A01B 39/18; A01M 21/00–21/046; A01D 34/00–34/905; A01D 45/00–45/30
See application file for complete search history.

(56) References Cited

U.S. PATENT DOCUMENTS

| | | | | |
|---|---|---|---|---|
| 4,920,737 A | * | 5/1990 | Wieneke | A01D 75/08 56/294 |
| 8,171,707 B2 | * | 5/2012 | Kitchel | A01D 45/02 56/504 |

(Continued)

FOREIGN PATENT DOCUMENTS

| | | |
|---|---|---|
| CN | 107046823 A | 8/2017 |
| CN | 107624281 A | 1/2018 |

(Continued)

*Primary Examiner* — Joseph M Rocca
*Assistant Examiner* — Madeline I Runco
(74) *Attorney, Agent, or Firm* — Bayramoglu Law Offices LLC

(57) ABSTRACT

A weeding machine and a weeding method for seedlings in a paddy field are disclosed. The weeding machine includes a paddy field power chassis, a lifting hydraulic cylinder, a parallelogram suspension frame, a weeding frame, a transmission assembly, and weeding units. The paddy field power chassis vertically adjusts the working depth of the weeding machine through the parallelogram suspension frame and the lifting hydraulic cylinder. The power is transmitted to the weeding units by the transmission assembly. The weeding units are used for pulling out weeds between rows and feeding the weeds to weed chopping channels. Spiral weed chopping knives are used for chopping the weeds and conveying the weeds to feeding channels. Bidirectional variable-pitch augers are used for conveying the chopped weeds to discharge openings of the feeding channels under pressure and discharging the chopped weeds for burying weeds between plants.

11 Claims, 6 Drawing Sheets

(51) Int. Cl.
*A01D 45/04* (2006.01)
*A01M 21/02* (2006.01)

(56) References Cited

U.S. PATENT DOCUMENTS

2018/0007834 A1    1/2018  Martin et al.
2019/0216018 A1*   7/2019  Bassett ................ A01D 43/14

FOREIGN PATENT DOCUMENTS

| CN | 108770469 A | 11/2018 |
| CN | 109220007 A | 1/2019 |
| CN | 109275364 A | 1/2019 |
| CN | 110291857 A | 10/2019 |
| CN | 110521306 A | 12/2019 |
| CN | 211047790 U | 7/2020 |
| CN | 110291857 B | 4/2024 |

* cited by examiner

WEEDING MACHINE AND WEEDING METHOD FOR SEEDLINGS IN PADDY FIELD

CROSS REFERENCE TO THE RELATED APPLICATIONS

This application is a continuation application of International Application No. PCT/CN2020/117562, filed on Sep. 25, 2020, which is based upon and claims priority to Chinese Patent Application No. 202010753597.2, filed on Jul. 30, 2020, the entire contents of which are incorporated herein by reference.

TECHNICAL FIELD

The present disclosure belongs to the technical field of agricultural production and relates to a weeding machine and a weeding method for seedlings in a paddy field.

BACKGROUND

Weeds are an inevitable harmful factor in a paddy field environment. The weeds compete with seedlings for growth space, fertilizer nutrients, light, and other resources, which seriously affect the yield and quality of rice. It has been reported that the loss rate of rice yield resulting from damages caused by weeds is greater than 15% each year. Chemical herbicide is one of the most widely used weeding modes at present and has the advantages of fastness, efficiency, and economy. However, the extensive use of chemical herbicides causes problems, such as environmental pollution, pesticide residues, and the like. The development of a non-chemical herbicide weeding technology has received more and more government support and research attention.

At present, manual weeding is still the main mode of non-chemical herbicide weeding in Asia, which is to pull out weeds manually and discard the weeds to ridges of the field, so that the weeding operation is thorough and the whole process is pollution-free. However, the manual weeding mode has low efficiency and high labor cost. During the weeding of seedlings in a paddy field, mechanized operation tools are urgently needed for replacing manual weeding operations. In this regard, CN201910793095.X discloses an automatic multi-line rice seedling bed weeding machine, which uses a blade-type weeding wheel to pull out weeds between rows and uses an inter-plant weeding needle assembly to pull out weeds between plants. In addition, CN201910624258.1, CN201811396769.4, and the like further disclose a rake-tooth type inter-row weeding device that adopts a rake-tooth type weeding wheel to pull out weeds between rows. The above blade type or rake tooth type weeding devices all achieve the purpose of pulling out weeds through the rotation action of the blades or rake teeth, but the weeding operations of such devices are not enough. Weeds usually have strong vitality and can be restored after being pulled out by blades or rake teeth and discarded to a paddy field environment, which leads to the unsatisfactory weeding effect of the above devices. Therefore, it is necessary to develop a weeding machine that can pull out weeds and thoroughly kill the activity of the weeds to realize the inter-row and inter-plant weeding of seedlings in paddy fields.

SUMMARY

The present disclosure aims to overcome the problems existing in the prior art and provides a weeding machine and a weeding method for seedlings in a paddy field. The weeding method includes the following steps: pulling out weeds between rows through a weed collecting screw, chopping the weeds by using a spiral weed chopping knife, conveying the chopped weeds under pressure by using a bidirectional variable-pitch auger, burying weeds between plants by using the chopped weeds, and retaining the seedlings. The inter-row and inter-plant weeding of the seedlings in the paddy field is realized by the mode of pulling out weeds, chopping the weeds, and burying weeds. The weeding operation is thorough, the working efficiency is high, and the weeding effect is good.

The technical solution used by the present disclosure to solve the technical problem is as follows:

A weeding machine for seedlings in a paddy field includes a paddy field power chassis, a lifting hydraulic cylinder, a parallelogram suspension frame, a weeding frame, a transmission assembly, and weeding units. One end of the lifting hydraulic cylinder is connected with the paddy field power chassis, and the other end of the lifting hydraulic cylinder is connected with the parallelogram suspension frame. One end of the parallelogram suspension frame is connected with the paddy field power chassis, and the other end of the parallelogram suspension frame is connected with the weeding frame. The transmission assembly and the weeding units each are arranged on the weeding frame.

The transmission assembly includes a transmission spindle, a cover plate, a transmission shaft I, a transmission shaft II, a power input shaft, a transmission shaft III, a transmission shaft IV, and weeding unit spindles. One end of the transmission spindle is connected with the paddy field power chassis, and the other end of the transmission spindle is connected with the power input shaft. The transmission shaft II and the transmission shaft III are connected with the power input shaft through chain transmission. The transmission shaft I is connected with the transmission shaft II through chain transmission. The transmission shaft IV is connected with the transmission shaft III through chain transmission. The transmission shaft I, the transmission shaft II, the transmission shaft III, and the transmission shaft IV are connected with the weeding unit spindles through chain transmission. The cover plate is connected with the weeding frame. Each weeding unit includes a floating plate frame, floating plates, the weeding unit spindle, a spiral weed chopping knife, a weed chopping channel, a weeding unit frame, a worm transmission case I, weed collecting screws, weed collecting inverted teeth, a weed collecting spiral shaft, a feeding channel, a discharge opening, a bidirectional variable-pitch auger, an auger shaft, a worm transmission case II, and a feeding shaft. The floating plate frame is connected with the weeding frame. The floating plates are connected with the floating plate frame. The weeding unit spindles are connected with the weed chopping channels; the weed chopping channels are connected with the weeding unit frames. The weeding unit frames are connected with the weeding frame. The spiral weed chopping knives are connected with the weeding unit spindles. One end of the worm transmission case I is connected with the weeding unit spindles, and the other end of the worm transmission case I is connected with the weed collecting spiral shafts. The weed collecting screws are connected with the weed collecting spiral shafts. The weed collecting inverted teeth are mounted on each weed collecting screw. The feeding channels are connected with the weed chopping channels. The discharge openings are connected with the feeding channels. The auger shafts are connected with the feeding channels. The bidirectional variable-pitch augers are connected with the auger shafts. One end of the worm transmission case II is connected with the auger shafts, and the other end of the worm transmission case II is connected with the feeding shafts; and the feed shafts are connected with the weeding unit spindles through chain transmission.

According to the weeding machine for seedlings in a paddy field, the weeding frame is provided with six to eight groups of weeding units, and the floating plate frame is provided with four to six floating plates.

According to the weeding machine for seedlings in a paddy field, each weed collecting screw includes two groups of spiral structures rotating in opposite directions. Each spiral structure is provided with four to eight groups of weed collecting inverted teeth, and the angle of the inverted teeth is 50° to 70°.

According to the weeding machine for seedlings in a paddy field, each spiral weed chopping knife includes six to ten groups of teeth, and the teeth are in a spiral structure.

According to the weeding machine for seedlings in a paddy field, the distance between the inner surfaces of the weed chopping channels and the surfaces of the spiral weed chopping knives is 2 mm to 5 mm so that effective cutting of weeds is ensured, and the inner surfaces of the weed chopping channels are made of wear-resistant metal material.

According to the weeding machine for seedlings in a paddy field, each bidirectional variable-pitch auger includes two groups of spiral augers rotating in opposite directions, and the pitch of each bidirectional variable-pitch auger is variable and is gradually reduced from a feed opening to the discharge openings.

The present disclosure relates to an inter-row and inter-plant weeding method for seedlings in a paddy field, which uses a working mode of pulling out weeds, chopping the weeds, and burying weeds. The depth of weeding operation of the weeding machine is adjusted through the lifting hydraulic cylinder, and the power of the paddy field power chassis is transmitted to the weeding units through the transmission assembly. When working, the weeding units operate between the rows of the seedlings, and the weeds between the rows are pulled out through the rotation action of the weed collecting screws and are fed to the weed chopping channels to realize the inter-row weeding of the seedlings in the paddy field. The weeds are chopped and conveyed to the feeding channels under the rotary cutting action of the spiral weed chopping knives and are conveyed to the discharge openings on both sides of the feeding channels under pressure by the bidirectional variable-pitch augers. The chopped weeds are discharged from the discharge openings and fall between the plants of the seedlings, and the weeds between the plants are buried to inhibit photosynthesis of the weeds to achieve inter-plant weeding. Because the seedlings have high compressive strength, the seedlings are retained after the weeds are buried by the chopped weeds, thus completing the inter-row and inter-plant weeding operations of the seedlings in the paddy field.

The weeding machine and the weeding method disclosed by the present disclosure have the beneficial effects that the weeding machine and the weeding method use a working mode of pulling out weeds, chopping the weeds, and burying weeds. The weeds between the rows are pulled out through the weed collecting screws. The pulled weeds are chopped through the spiral weed chopping knives, and the chopped weeds are conveyed to the discharge openings under pressure through the bidirectional variable-pitch augers. The weeds between the plants are buried, and the seedlings are retained, thus realizing inter-row and inter-plant weeding of the seedlings in the paddy field. The weeding method of pulling out the weeds, chopping the weeds, and burying the weeds thoroughly kills the activity of the weeds and solves the problem that the weeds revive. The weeding machine and the weeding method disclosed by the present disclosure have thorough weeding operation, high working efficiency, and good weeding effect.

BRIEF DESCRIPTION OF THE DRAWINGS

The present disclosure will be further described below in conjunction with the accompanying drawings and embodiments.

Figure 1:
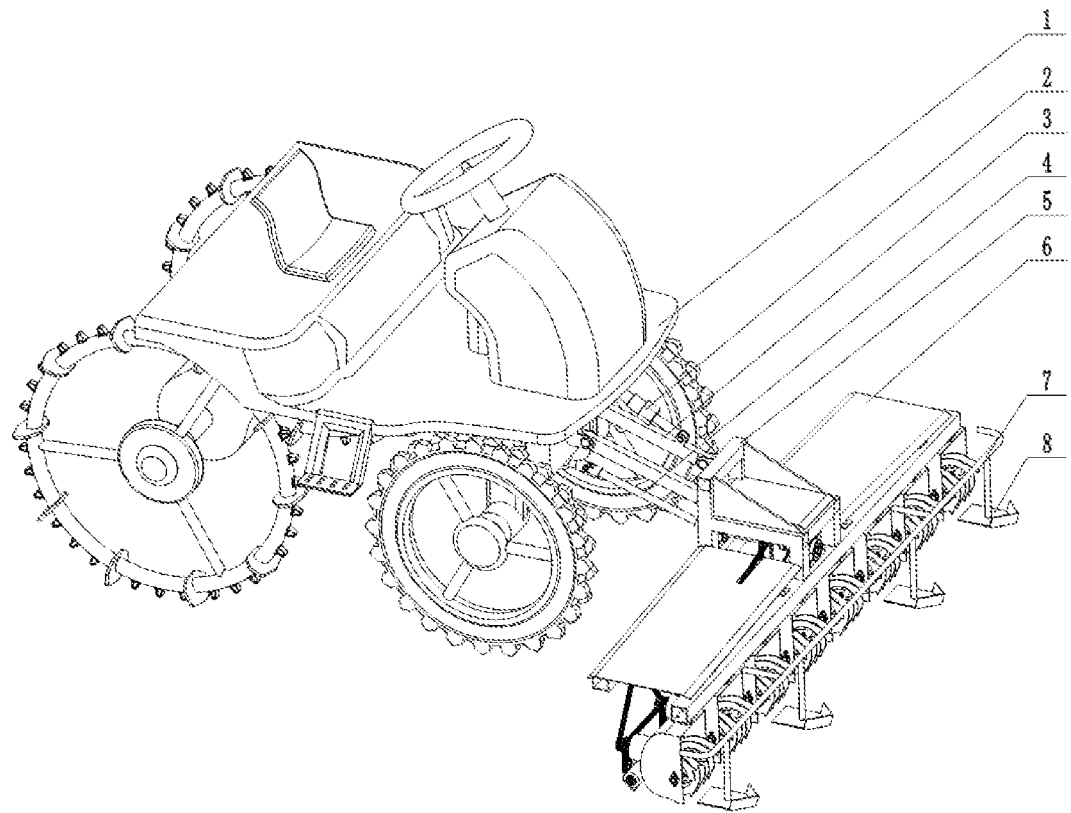
FIG. 1 is a structural schematic diagram of a weeding machine for seedlings in a paddy field.

Reference numerals: paddy field power chassis 1, lifting hydraulic cylinder 2, parallelogram suspension frame 3, transmission spindle 4, weeding frame 5, cover plate 6, floating plate frame 7, floating plate 8, transmission shaft I 9, transmission shaft II 10, power input shaft 11, transmission shaft III 12, transmission shaft IV 13, weeding unit spindle 14, spiral weed chopping knife 15, weed chopping channel 16, weeding unit frame 17, worm transmission case I 18, weed collecting screw 19, weed collecting inverted tooth 20, weed collecting spiral shaft 21, feeding channel 22, discharge opening 23, bidirectional variable-pitch auger 24, auger shaft 25, worm transmission case II 26, feeding shaft 27, seedlings 28, and weeds 29.

DETAILED DESCRIPTION OF THE EMBODIMENTS

The present disclosure will be further described in detail below in conjunction with the accompanying drawings and embodiments.

Figure 2:
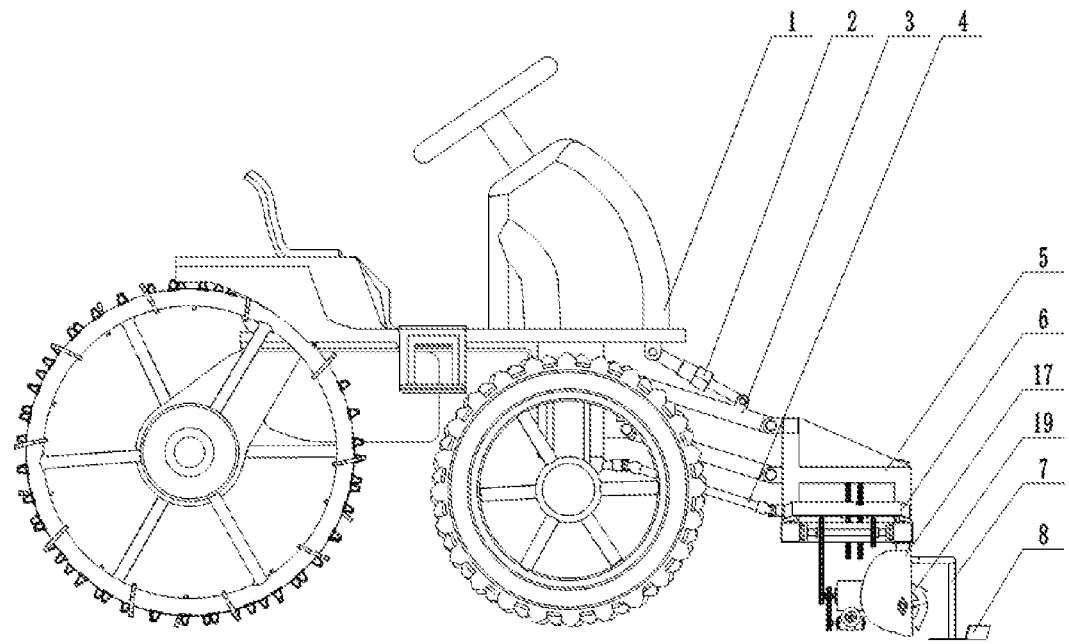
FIG. 2 is a side view of a weeding machine for seedlings in a paddy field.
Figure 3:
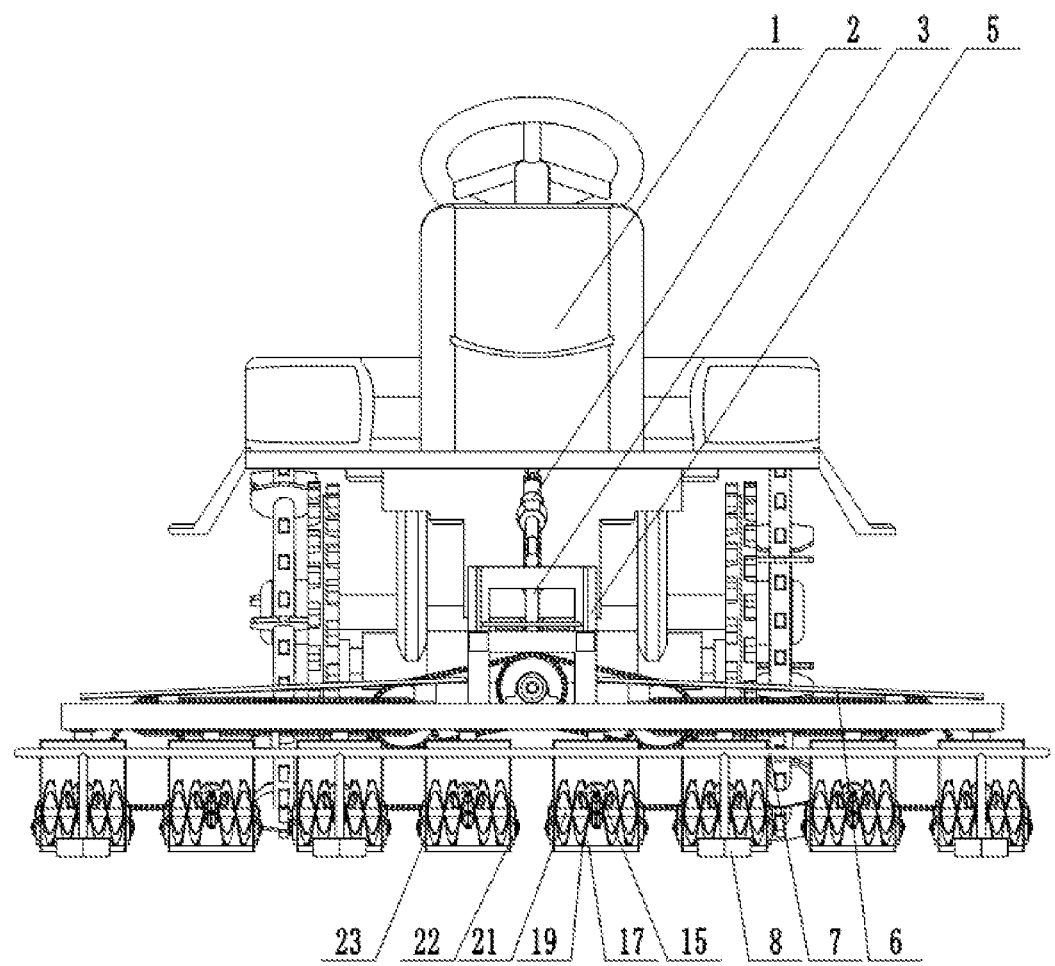
FIG. 3 is a front view of a weeding machine for seedlings in a paddy field.

As shown in FIG. 1, FIG. 2 and FIG. 3, a weeding machine for seedlings in a paddy field includes a paddy field power chassis 1, a lifting hydraulic cylinder 2, a parallelogram suspension frame 3, a weeding frame 5, a transmission assembly, and weeding units. One end of the lifting hydraulic cylinder 2 is connected with the paddy field power chassis 1, and the other end of the lifting hydraulic cylinder 2 is connected with the parallelogram suspension frame 3. The weeding machine realizes the lifting of the weeding frame 5 through the reciprocating motion of the hydraulic cylinder. One end of the parallelogram suspension frame 3 is connected with the paddy field power chassis 1, and the other end of the parallelogram suspension frame 3 is connected with the weeding frame 5. The suspension frame is in a parallelogram structure so that the weeding frame 5 can be lifted in the vertical direction, and the transmission assembly and the weeding units each are mounted on the weeding frame 5.

Figure 4:
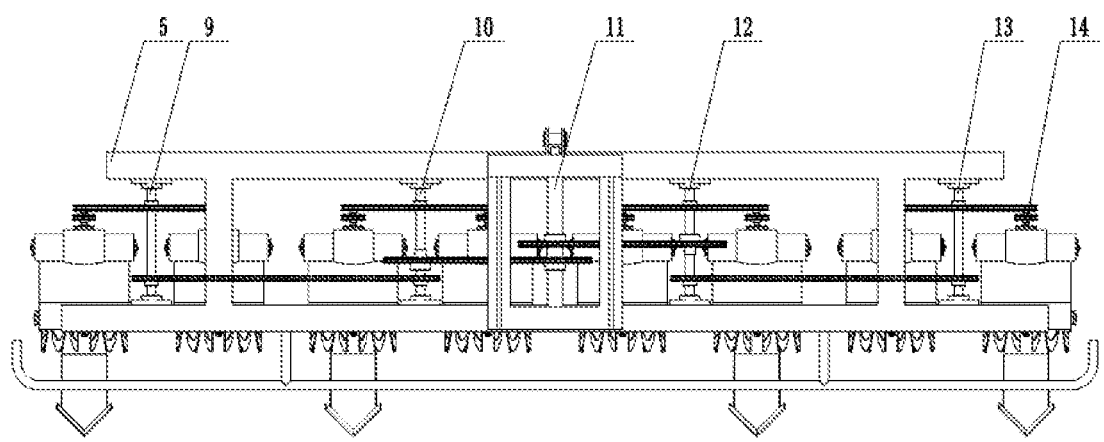
FIG. 4 is a schematic diagram of a transmission system of a weeding machine for seedlings in a paddy field.

As shown in FIG. 4, the transmission assembly includes a transmission spindle 4, a cover plate 6, a transmission shaft I 9, a transmission shaft II 10, a power input shaft 11, a transmission shaft III 12, a transmission shaft IV 13, and weeding unit spindles 14. One end of the transmission spindle 4 is connected with the paddy field power chassis 1, and the other end of the transmission spindle 4 is connected with the power input shaft 11. Both ends of the transmission spindle 4 are connected through universal joints. The transmission shaft II 10 and the transmission shaft III 12 are connected with the power input shaft 11 through chain transmission. The transmission shaft I 9 is connected with the transmission shaft II 10 through chain transmission. The transmission shaft IV 13 is connected with the transmission shaft III 12 through chain transmission. The transmission shaft I 9, the transmission shaft II 10, the transmission shaft III 12, and the transmission shaft IV 13 are connected with the weeding unit spindles 14 through chain transmission. Through the above chain transmission connection, the weeding unit spindle 14 of each weeding unit can keep rotating in the same direction at a constant speed. The cover plate 6 is connected with the weeding frame 5, and the cover plate 6 has a protective effect.

Figure 5:
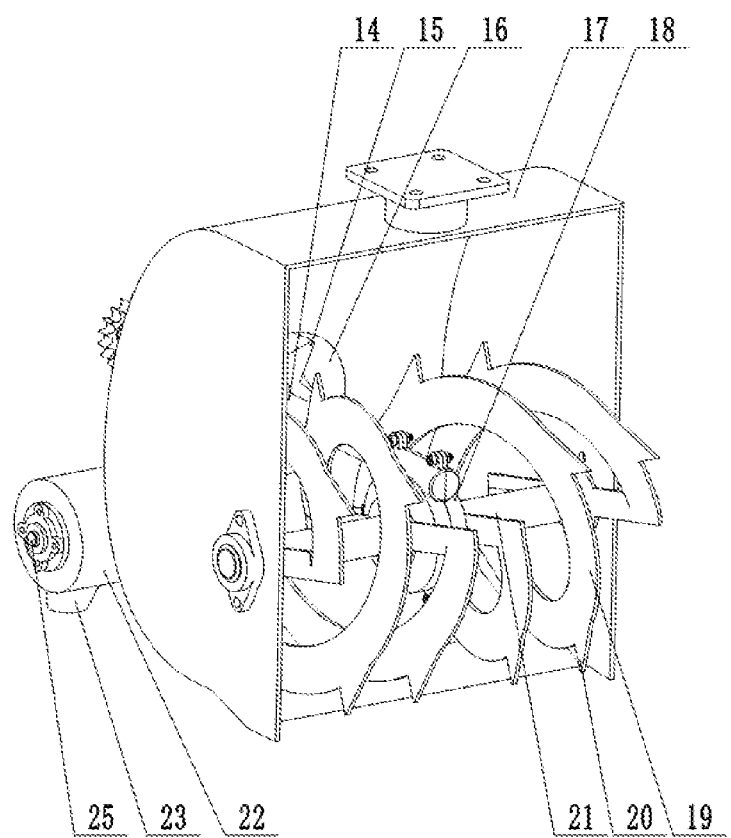
FIG. 5 is a structural schematic diagram of a weeding unit of a weeding machine.
Figure 6:
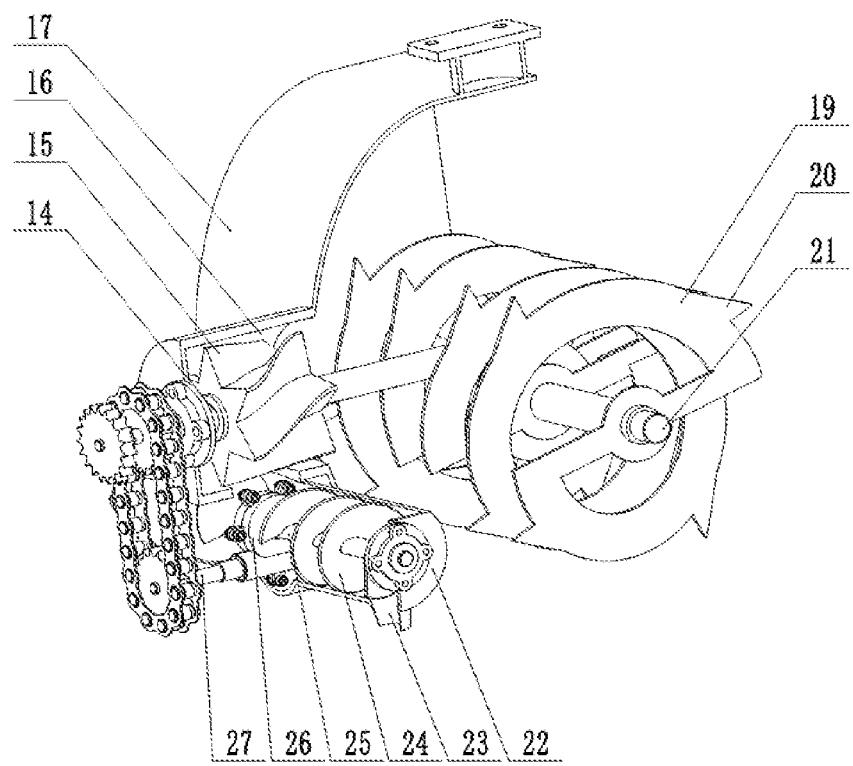
FIG. 6 is a structural sectional view of a weeding unit of a weeding machine.

As shown in FIG. 5 and FIG. 6, each weeding unit includes a floating plate frame 7, floating plates 8, the weeding unit spindle 14, a spiral weed chopping knife 15, a weed chopping channel 16, a weeding unit frame 17, a worm transmission case I 18, weed collecting screws 19, weed collecting inverted teeth 20, a weed collecting spiral shaft 21, a feeding channel 22, a discharge opening 23, a bidirectional variable-pitch auger 24, an auger shaft 25, a worm transmission case II 26, and a feeding shaft 27. The floating plate frame 7 is connected with the weeding frame 5, and the floating plates 8 are connected with the floating plate frame 7. The floating plates 8 are mainly used for limiting the operational depth of the weeding units. The weeding unit spindles 14 are connected with the weed chopping channels 16. The weed chopping channels 16 are connected with the weeding unit frames 17 and are positioned at the rear parts of the weed collecting screws 19. The weeding unit frames 17 are connected with the weeding frame 5. The spiral weed chopping knives 15 are connected with the weeding unit spindles 14 and are positioned in the weed chopping channels 16. The fed weeds 29 are chopped in a rotary cutting mode. One end of the worm transmission case I 18 is connected with the weeding unit spindles 14, and the other end of the worm transmission case I 18 is connected with the weed collecting spiral shafts 21. The power of the weeding unit spindles 14 is vertically transmitted to the weed collecting spiral shafts 21. The weed collecting screws 19 are connected with the weed collecting spiral shafts 21. The weed collecting inverted teeth 20 are mounted on each weed collecting screw 19. The weeds 29 between rows are pulled out and fed into the weed chopping channels 16 under the rotation action of the weed collecting screws 19 and the weed collecting inverted teeth 20. The feeding channels 22 are connected with the weed chopping channels 16 and are positioned below the weed chopping channels 16. The discharge openings 23 are connected with the feeding channels 22. The auger shafts 25 are connected with the feeding channels 22. The bidirectional variable-pitch augers 24 are connected with the auger shafts 25. One end of the worm transmission case II 26 is connected with the auger shafts 25, and the other end of the worm transmission case II 26 is connected to the feeding shafts 27. The power of the feeding shafts 27 is vertically transmitted to the auger shafts 25, and the feeding shafts 27 are connected with the weeding unit spindles 14 through chain transmission.

According to the weeding machine for seedlings in a paddy field, the weeding frame 5 is provided with six to eight groups of weeding units, and the floating plate frame 7 is provided with four to six floating plates 8 so that 6 to 8 rows of seedlings in the paddy field can be weeded synchronously.

Figure 7:
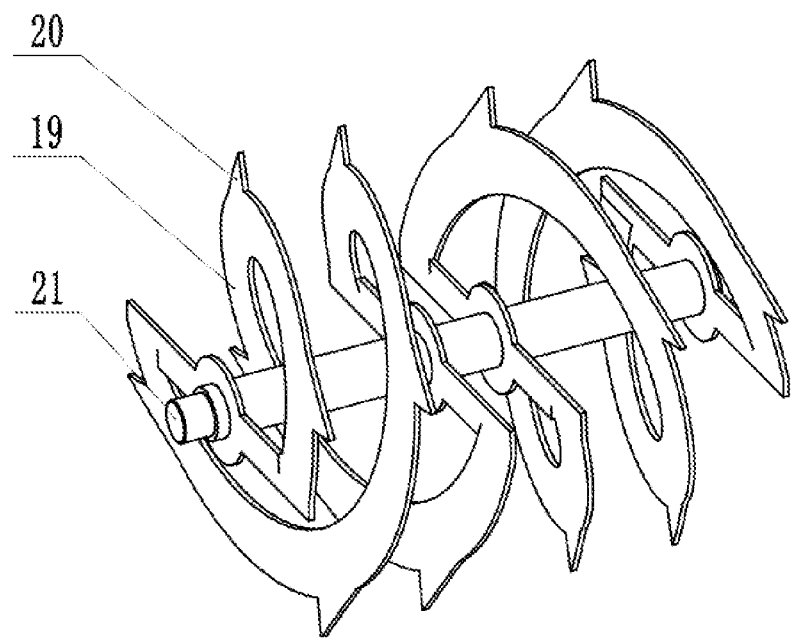
FIG. 7 is a structural schematic diagram of a weed collecting screw of a weeding unit.

As shown in FIG. 7, according to the weeding machine for seedlings in a paddy field, each weed collecting screw 19 includes two groups of spiral structures rotating in opposite directions. Four to eight groups of weed collecting inverted teeth 20 are mounted on each spiral structure, and the angle of the inverted teeth is 50° to 70°. The weeds 29 between rows are pulled out under the rotation action of the weed collecting screws 19 and the weed collecting inverted teeth 20 and are fed to the weed chopping channels 16 from both ends to the middle under the action of the two groups of spiral structures rotating in opposite directions.

Figure 8:
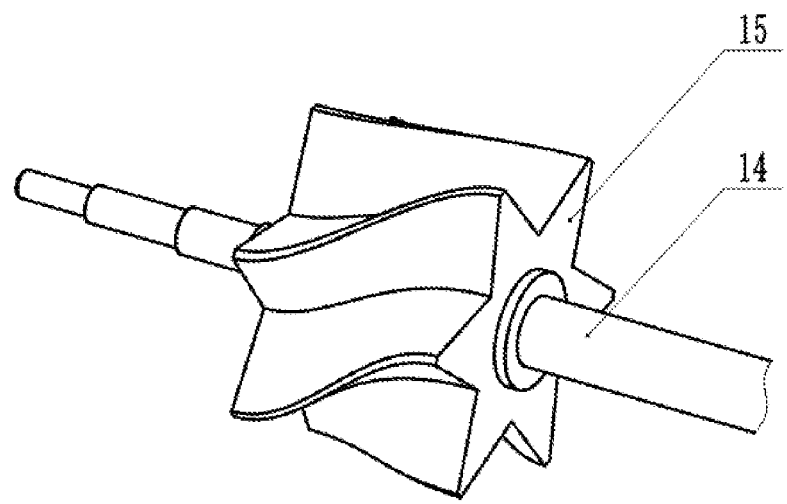
FIG. 8 is a structural schematic diagram of a spiral weed chopping knife of a weeding unit.

As shown in FIG. 8, according to the weeding machine for seedlings in a paddy field, each spiral weed chopping knife 15 includes six to ten groups of teeth, the teeth are in a spiral structure. The spiral weed chopping knives 15 chop the fed weeds 29 through the rotary cutting action of the teeth, and the weeds 29 are fed to the feeding channels 22 from outside to inside along the spiral direction.

According to the weeding machine for seedlings in a paddy field, the distance between the inner surfaces of the weed chopping channels 16 and the surfaces of the spiral weed chopping knives 15 is 2 mm to 5 mm. Effective cutting of the weeds 29 is ensured by controlling the distance. The inner surfaces of the weed chopping channels 16 are made of wear-resistant metal material so that the service life of the weed chopping channels 16 is prolonged.

Figure 9:
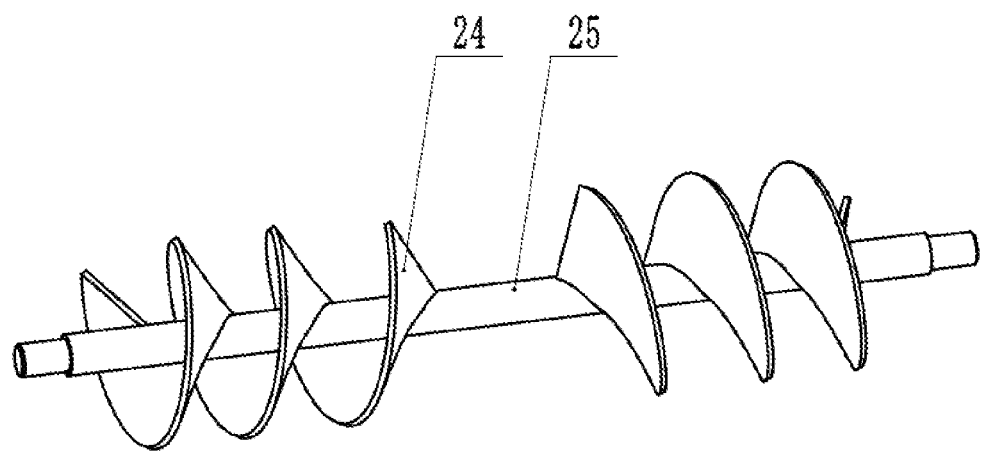
FIG. 9 is a structural schematic diagram of a bidirectional variable-pitch auger of a weeding unit.

As shown in FIG. 9, according to the weeding machine for seedlings in a paddy field, each bidirectional variable-pitch auger 24 includes two groups of spiral augers rotating in opposite directions. The pitch of each bidirectional variable-pitch auger 24 is variable and is gradually reduced from a feed opening to the discharge openings. The two groups of spiral augers rotating in opposite directions convey the chopped weeds 29 from the feed opening to the discharge openings at two ends. The gradually reduced pitch enables the spiral augers to compress the chopped weeds in the conveying process, thereby improving the density of the chopped weeds and achieving a better burying effect.

Figure 10:
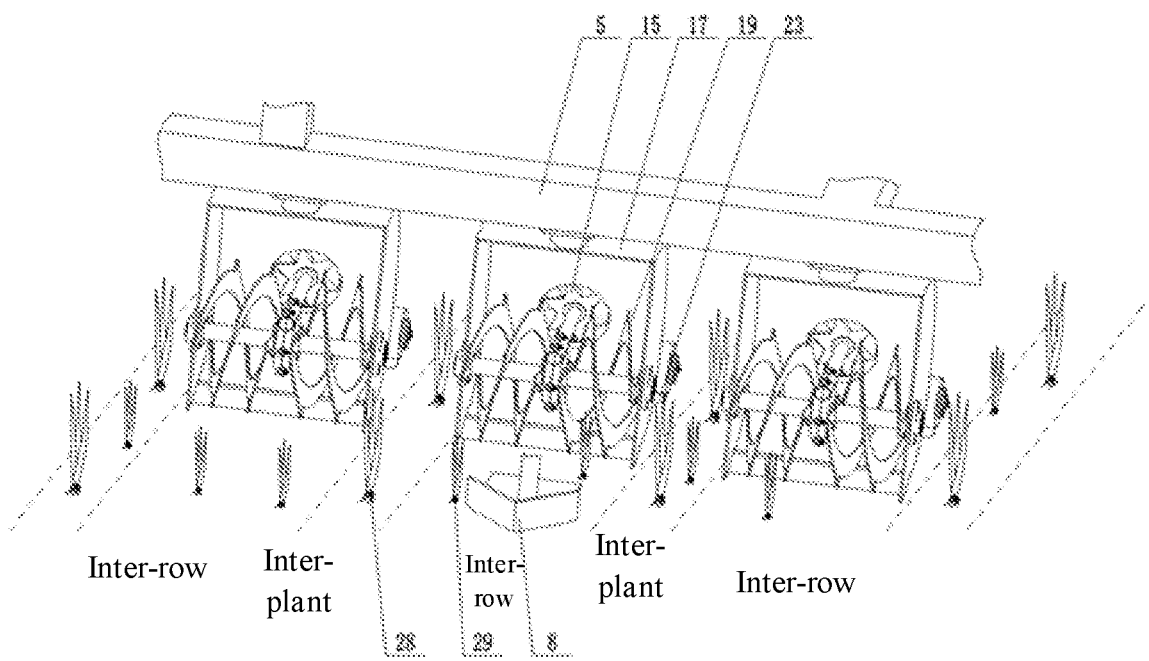
FIG. 10 is a schematic diagram of a working method for inter-row and inter-plant weeding of seedlings by a weeding machine.

As shown in FIG. 10, the inter-row and inter-plant weeding method for seedlings in a paddy field uses a working mode of pulling out weeds, chopping the weeds, and burying weeds. The depth of weeding operation of the weeding machine is adjusted to a proper position through the lifting hydraulic cylinder 2, and the power of the paddy field power chassis 1 is transmitted to the weeding units through the transmission assembly. When working, the weeding units operate between the rows of the seedlings, and the weeds 29 between the rows are pulled out through the rotation action of the weed collecting screws 19 and are fed into the weed chopping channels 16 to realize the inter-row weeding of the seedlings 28 in the paddy field. The weeds 29 are chopped and conveyed to the feeding channels 22 under the rotary cutting action of the spiral weed chopping knives 15 and are conveyed to the discharge openings 23 on both sides of the feeding channels 22 under pressure by the bidirectional variable-pitch augers 24. The chopped weeds 29 are discharged from the discharge openings 23 and fall between the plants of the seedlings 28. The weeds 29 between the plants are buried to inhibit photosynthesis of the weeds 29 to achieve inter-planting weeding. Because the seedlings 28 have high compressive strength, the seedlings are retained after the weeds are buried by chopped weeds, thus completing the inter-row and inter-plant weeding operations of the seedlings in the paddy field.

The working process of the weeding machine of the weeding method disclosed by the present disclosure is as follows: The weeding machine carries out seedling weeding operations in a paddy field environment. The paddy field power chassis 1 adjusts the lifting hydraulic cylinder 2 to change the depth of weeding operation so that the weeding units operate at an appropriate working depth. The power of the paddy field power chassis 1 is transmitted to the weeding units through the transmission assembly. The weed collecting screws 19 rotate along the advancing direction of the weeding machine, and the weeds 29 between the rows are pulled out and fed to the weed chopping channels 16, chopped by the spiral weed chopping knives 15, and then conveyed to the feeding channels 22. The chopped weeds 29 are conveyed under pressure by the bidirectional variable-pitch augers 24 and are finally discharged from the discharge openings 23 and fall between the plants of the seedlings 28 to bury weeds 29 while the seedlings 28 are retained, thereby completing the inter-row and inter-plant weeding of the seedlings in the paddy field.

The present disclosure relates to a weeding machine and a weeding method for seedlings in a paddy field, which use a working mode of pulling out weeds, chopping the weeds, and burying weeds. The weeds between the rows 29 are pulled out by the weed collecting screws 19. The weeds 29 are chopped by the spiral weed chopping knives 15. The chopped weeds are conveyed under pressure by the bidirectional variable-pitch augers 24, and finally, the weeds between the plants 29 are buried by the chopped weeds, and the seedlings 28 are retained so that the inter-row and inter-plant weeding of the seedlings in the paddy field is realized. The weeding operation is thorough, the working efficiency is high, and the weeding effect is good.

The embodiments listed above are merely specific embodiments of the present disclosure. The present disclosure is not limited to the above embodiments and may also have many transformations. All transformations that can be directly derived or associated with the present disclosure by those skilled in the art should be deemed as falling within the protection scope of the present disclosure.

What is claimed is:

1. A weeding machine for seedlings in a paddy field, comprising a paddy field power chassis, a lifting hydraulic cylinder, a parallelogram suspension frame, a weeding frame, a transmission assembly, and weeding units,
   wherein a first end of the lifting hydraulic cylinder is connected with the paddy field power chassis, a second end of the lifting hydraulic cylinder is connected with the parallelogram suspension frame, a first end of the parallelogram suspension frame is connected with the paddy field power chassis, a second end of the parallelogram suspension frame is connected with the weeding frame, and each of the transmission assembly and each of the weeding units is mounted on the weeding frame;
   wherein the transmission assembly comprises a transmission spindle, a cover plate, a transmission shaft I, a transmission shaft II, a power input shaft, a transmission shaft III, a transmission shaft IV, and weeding unit spindles, wherein
   a first end of the transmission spindle is connected with the paddy field power chassis, a second end of the transmission spindle is connected with the power input shaft, each of the transmission shaft II and the transmission shaft III is connected with the power input shaft through a first chain transmission, the transmission shaft I is connected with the transmission shaft II through a second chain transmission, the transmission shaft IV is connected with the transmission shaft III through a third chain transmission, each of the transmission shaft I, the transmission shaft II, the transmission shaft III and the transmission shaft IV is connected with each of the weeding unit spindles through a fourth chain transmission, and the cover plate is connected with the weeding frame;
   wherein each of the weeding units comprises a floating plate frame, floating plates, the weeding unit spindle, a spiral weed chopping knife, a weed chopping channel, a weeding unit frame, a worm transmission case I, weed collecting screws, weed collecting inverted teeth, a weed collecting spiral shaft, a feeding channel, a discharge opening, a bidirectional variable-pitch auger, an auger shaft, a worm transmission case II, and a feeding shaft, wherein
   the floating plate frame is connected with the weeding frame, each of the floating plates is connected with the floating plate frame, each of the weeding unit spindles is connected with each of the weed chopping channels, each of the weed chopping channels is connected with each of the weeding unit frames, each of the weeding unit frames is connected with the weeding frame, each of the spiral weed chopping knives is connected with each of the weeding unit spindles, a first end of the worm transmission case I is connected with each of the weeding unit spindles, a second end of the worm transmission case I is connected with each of the weed collecting spiral shafts, each of the weed collecting screws is connected with each of the weed collecting spiral shafts, each of the weed collecting inverted teeth is mounted on each of the weed collecting screws, each of the feeding channels is connected with each of the weed chopping channels, each of the discharge openings is connected with each of the feeding channels, each of the auger shafts is connected with each of the feeding channels, each of the bidirectional variable-pitch augers is connected with each of the auger shafts, a first end of the worm transmission case II is connected with each of the auger shafts, a second end of the worm transmission case II is connected with each of the feeding shafts, and each of the feeding shafts is connected with each of the weeding unit spindles through a fifth chain transmission.

2. The weeding machine according to claim 1, wherein the weeding frame is provided with six to eight groups of weeding units, and the floating plate frame is provided with four to six floating plates.

3. The weeding machine according to claim 1, wherein each of the weed collecting screws comprises two groups of spiral structures, wherein the two groups of spiral structures rotate in opposite directions, each of four to eight groups of weed collecting inverted teeth is mounted on each of the two groups of spiral structures, and an angle of each of the weed collecting inverted teeth is 50° to 70°.

4. The weeding machine according to claim 1, wherein each of the spiral weed chopping knives comprises six to ten groups of teeth, and each of the six to ten groups of teeth is in a spiral structure.

5. The weeding machine according to claim 1, wherein a distance between an inner surface of each of the weed chopping channels and a surface of each of the spiral weed chopping knives is 2 mm to 5 mm, and the inner surface of each of the weed chopping channels is made of a wear-resistant metal material.

6. The weeding machine according to claim 1, wherein each of the bidirectional variable-pitch augers comprises two groups of spiral augers, wherein the two groups of spiral augers rotate in opposite directions, and a pitch of each of the bidirectional variable-pitch augers is variable and the pitch of each of the bidirectional variable-pitch augers is gradually reduced from a feed opening to each of the discharge openings.

7. An inter-row and inter-plant weeding method for seedlings in a paddy field by using the weeding machine according to claim 1, wherein a working mode of pulling out weeds, chopping the weeds and burying the weeds is configured, a depth of a weeding operation of the weeding machine is adjusted through the lifting hydraulic cylinder, and a power of the paddy field power chassis is transmitted to each of the weeding units through the transmission assembly; when working, each of the weeding units operates between rows of the seedlings, the weeds between the rows are pulled out through a rotation action of each of the weed collecting screws, and the weeds between the rows are fed to each of the weed chopping channels, wherein an inter-row weeding of the seedlings in the paddy field is realized; and the weeds are chopped and conveyed to each of the feeding channels under a rotary cutting action of each of the spiral weed chopping knives to obtain chopped weeds, and the chopped weeds are conveyed to each of the discharge openings under a pressure by the bidirectional variable-pitch augers, wherein the discharge openings are respectively on two sides of the feeding channels, the chopped weeds are discharged from each of the discharge openings and the chopped weeds fall between plants of the seedlings, the weeds between the plants are buried, wherein photosynthesis of the weeds is inhibited to realize an inter-plant weeding, wherein the seedlings have a high compressive strength, the seedlings are retained after the weeds are buried by the chopped weeds, and inter-row and inter-plant weeding operations of the seedlings in the paddy field are completed.

8. The inter-row and inter-plant weeding method according to claim 7, wherein in the weeding machine, the weeding frame is provided with six to eight groups of weeding units, and the floating plate frame is provided with four to six floating plates.

9. The inter-row and inter-plant weeding method according to claim 7, wherein in the weeding machine, each of the weed collecting screws comprises two groups of spiral structures, wherein the two groups of spiral structures rotate in opposite directions, each of four to eight groups of weed collecting inverted teeth is mounted on each of the two groups of spiral structures, and an angle of each of the weed collecting inverted teeth is 50° to 70°.

10. The inter-row and inter-plant weeding method according to claim 7, wherein in the weeding machine, each of the spiral weed chopping knives comprises six to ten groups of teeth, and each of the six to ten groups of teeth is in a spiral structure.

11. The inter-row and inter-plant weeding method according to claim 7, wherein in the weeding machine, a distance between an inner surface of each of the weed chopping channels and a surface of each of the spiral weed chopping knives is 2 mm to 5 mm, and the inner surface of each of the weed chopping channels is made of a wear-resistant metal material.

* * * * *